US010011364B1

(12) United States Patent
Tabor et al.

(10) Patent No.: US 10,011,364 B1
(45) Date of Patent: Jul. 3, 2018

(54) COLLAPSABLE RIPCORD GRIP

(71) Applicant: The United States of America as Represented by the Secretary of the Army, Washington, DC (US)

(72) Inventors: Dale E. Tabor, Warren, MA (US); Brian E. Grady, Worcester, MA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 171 days.

(21) Appl. No.: 14/934,475

(22) Filed: Nov. 6, 2015

(51) Int. Cl.
B64D 17/52 (2006.01)

(52) U.S. Cl.
CPC .................... B64D 17/52 (2013.01)

(58) Field of Classification Search
CPC ........ B65D 17/52; B65D 17/22; B65D 17/30; B65D 17/24; B65D 17/40; B65D 17/38; B65D 17/50; B65D 17/48; B65D 17/32; A45F 3/04
See application file for complete search history.

(56) References Cited

U.S. PATENT DOCUMENTS

| | | | | |
|---|---|---|---|---|
| 2,130,569 A | * | 9/1938 | Smith | B64D 17/52 244/148 |
| 3,908,937 A | * | 9/1975 | Poynter | B64D 17/40 244/148 |
| 4,467,986 A | | 8/1984 | Birch et al. | |
| 4,933,231 A | * | 6/1990 | Seber | B32B 5/26 156/73.1 |
| 7,837,152 B2 | * | 11/2010 | Booth | B64D 17/52 244/149 |
| 2004/0155153 A1 | | 8/2004 | Booth | |
| 2005/0067533 A1 | | 3/2005 | Lukavec | |
| 2006/0038078 A1 | | 2/2006 | Hirst et al. | |
| 2006/0145014 A1 | * | 7/2006 | Preston | B64D 17/46 244/148 |
| 2006/0175128 A1 | | 8/2006 | Vonblon | |
| 2006/0273225 A1 | | 12/2006 | Bahniuk | |
| 2008/0251644 A1 | | 10/2008 | Booth | |
| 2009/0127395 A1 | | 5/2009 | Fradet | |
| 2010/0032526 A1 | | 2/2010 | Higgins | |
| 2011/0220764 A1 | | 9/2011 | Suh | |
| 2011/0220765 A1 | | 9/2011 | Eric | |
| 2012/0049005 A1 | | 3/2012 | Suh | |

* cited by examiner

*Primary Examiner* — Medhat Badawi
*Assistant Examiner* — Vicente Rodriguez
(74) *Attorney, Agent, or Firm* — Roger C Phillips

(57) ABSTRACT

Apparatuses and systems for activating parachutes are provided. For example, in an embodiment an apparatus includes a flexible concave shaped member between at least two layers of outer material. The outer layers are secured to each other. A first tuck flap and a second tuck flap are formed from portions of the outer layers of material. A plurality of locking tabs is secured to the outer layers of material. A handle and lanyard are secured to the outer layers and flexible material. A first locking pin is secured to one end of the lanyard and a second locking pin is secure to the other end of the lanyard.

5 Claims, 16 Drawing Sheets

COLLAPSABLE RIPCORD GRIP

STATEMENT OF GOVERNMENT INTEREST

The invention described herein may be manufactured and used by or for the U.S. Government for governmental purposes without the payment of any royalties thereon or therefor.

FIELD

Embodiments of the present invention generally relate to parachute systems and more specifically, to apparatuses and systems for activating parachutes.

BACKGROUND

Typical ripcord grips are non-aerodynamic designed in nature. They can be bulky and heavy due to the use of metals and cables. They rely solely on being secured via a hook and pile type material, metal clips, spring mechanisms, and or material tucks to keep in place that have a tendencies be non aerodynamic and to wear and fail without warning. They are prone to be snagged on the aircraft and or personal equipment, which may result in accidental deployment of the parachute that may cause serious injury and or death.

SUMMARY

Embodiments of the present invention generally relate to parachutes and more specifically, to apparatuses and systems for activating parachutes. Apparatuses and systems for activating parachutes are provided. For example, in an embodiment an apparatus includes a flexible concave shaped member between at least two layers of outer material. The outer layers are secured to each other. A first tuck flap and a second tuck flap are formed from portions of the outer layers of material. A plurality of locking tabs is secured to the outer layers of material. A handle and lanyard are secured to the outer layers and flexible material. A first locking pin is secured to one end of the lanyard and a second locking pin is secure to the other end of the lanyard.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
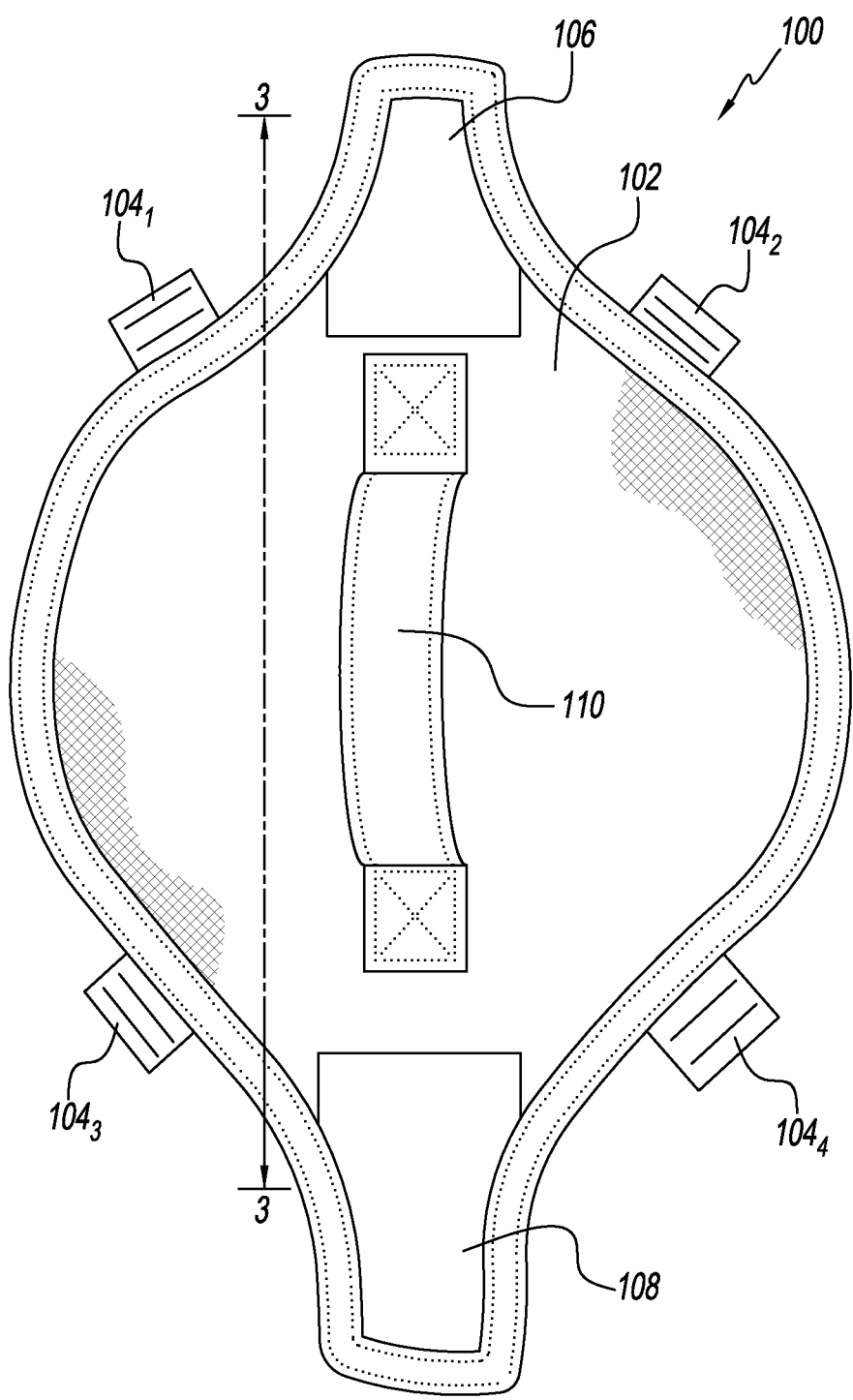
FIG. 1 depicts a perspective view of a collapsible ripcord grip, in accordance with an embodiment.

Embodiments presented herein are illustrated by way of example, and are not limited by the accompanying figures, in which like references indicate similar elements. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

Embodiments have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, numerous specific details are set forth to provide a more thorough understanding of the invention. As will be apparent to those skilled in the art, however, various changes using different configurations may be made without departing from the scope of the embodiments. In other instances, well-known features have not been described in order to avoid obscuring the embodiments disclosed herein. Thus, these embodiments are not considered limited to the particular illustrative embodiments shown in the specification and all such alternate embodiments are intended to be included in the scope of the appended claims.

Some of the advantages of the embodiments disclosed herein are: aerodynamic designs that reduces actuation due to wind between the ripcord grip and pack tray; designs that can be retrofitted to many existing parachute systems; an inclusion of "locking tabs;" and inclusion of a collapsible disk.

The collapsible ripcord grip is a device that maintains a parachute within a parachute pack tray during storage, transportation, and until a parachutist deploys the parachute. In addition to the aerodynamic design, embodiments also reduce hazards associated with snagging that can cause premature deployment of a parachute.

Embodiments disclosed herein can be used with main recovery parachutes. For example, embodiments disclosed herein can be used in high altitudes low opening ("HALO") parachute operations or from static line deployed type parachute operations; and/or emergency chest or seat mounted parachutes or any combination of such parachute systems.

Figure 3A:
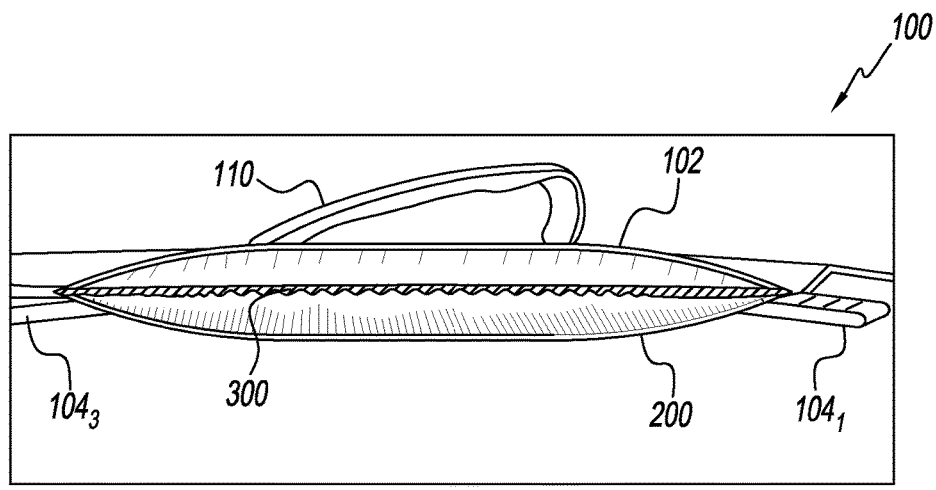
FIG. 3A and FIG. 3B depict a cross-sectional view along the 3-3 line of the embodiment depicted in FIG. 1.
Figure 3B:
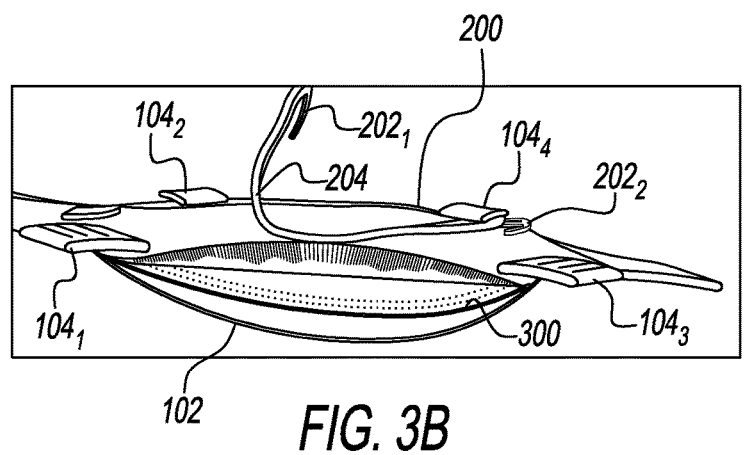

FIG. 1 depicts a perspective view of a collapsible ripcord grip 100, in accordance with an embodiment. The collapsible ripcord grip 100 includes a flexible/collapsible material (depicted in FIG. 3A and FIG. 3B as flexible member 300) sandwiched between at least two layers of outer material; a first tuck flap 106; a second tuck flap 108; and locking tabs 1041, 1042, 1043, and 1044 (collectively "locking tabs 104"). Although not shown in FIG. 1, the flexible/collapsible material is described below and is depicted in FIG. 3A and FIG. 3B.

In FIG. 1, only one of the outer layers is visible and is referred to herein as outside layer 102 or the "first layer of material." The outer layer 102 can be made of various materials. For example, in an embodiment, the outer layer can be made of "CORDURA" fabric (a registered trademark of Invista headquartered in Wichita, Kans.).

Attached to the outer layer 102 is a deployment/ripcord grip handle 110. In an embodiment, the ripcord grip handle 110 is constructed from a textile (e.g., CORDURA®), metal (e.g., steel/aluminum), composite (e.g., plastic/carbon fiber) and/or other similar material. There are various ways in which the ripcord grip handle 110 is attached to the outer layer 102. For example, in an embodiment, strips of material are used to form the ripcord grip handle 110 that is sewn, riveted, bolted, and/or any similar method to the outer layer 102. The location of the ripcord grip handle 110 is determined by principles of ergonomics for an individual movement to pull or deploy the parachute without hindering deployment of a parachute. In other embodiments, the ripcord grip handle 110 is secured to the ripcord grip 100 using an adhesive and rivets; stitching and an adhesive; or an adhesive and bolts.

Figure 2A:
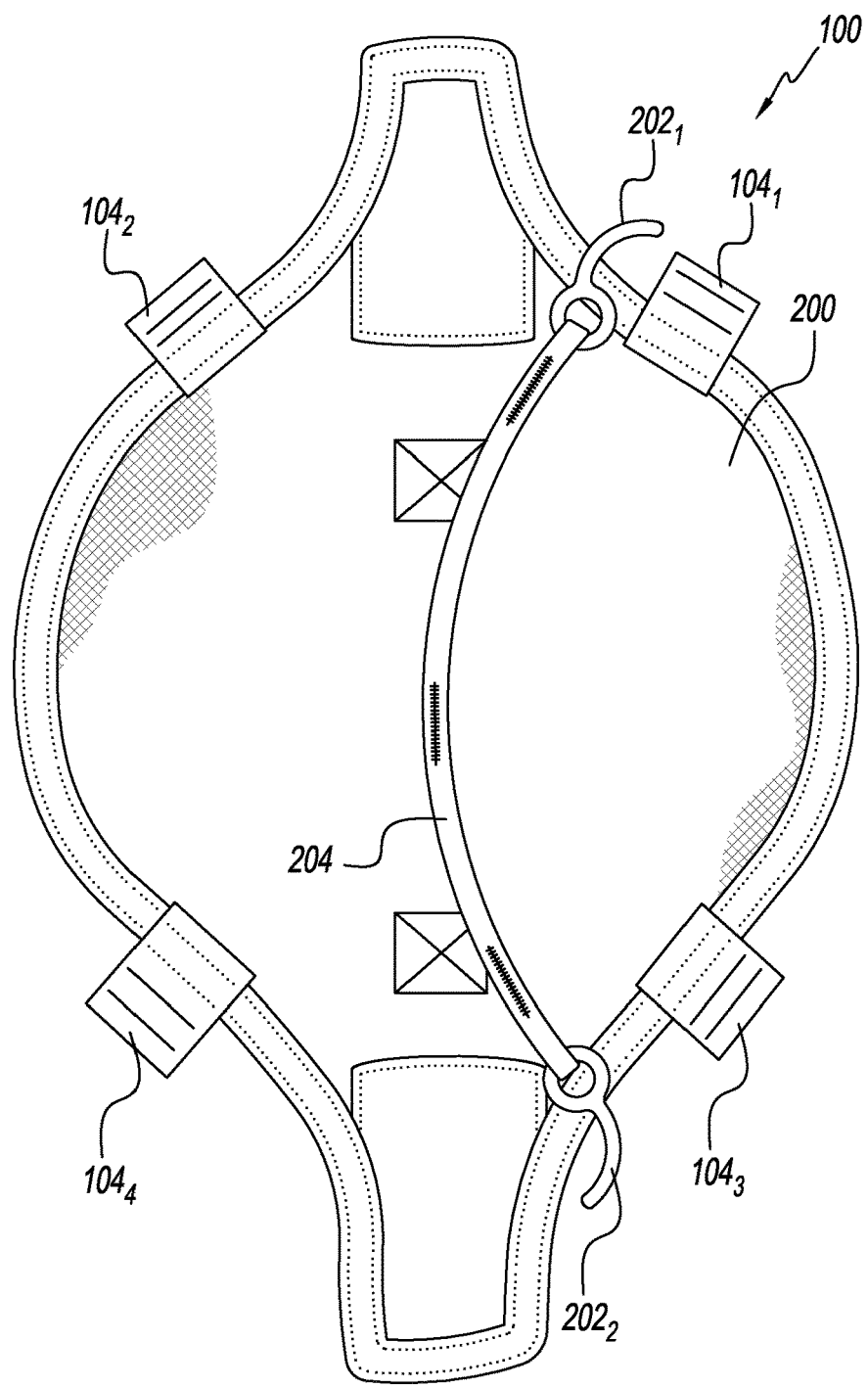
FIG. 2A depicts another perspective view of the embodiment of the collapsible ripcord grip 100 depicted in FIG. 1A.

FIG. 2A depicts another perspective view of the embodiment of the collapsible ripcord grip 100 depicted in FIG. 1. Specifically, FIG. 2A depicts an opposite side 200 (also referred to herein as the "bottom layer 200" or the "second layer of material") as of the collapsible ripcord grip 100 depicted in FIG. 1. Attached to the bottom layer 200 is a plurality of locking tabs 104. In an embodiment, the bottom layer 200 is made of CORDURA®.

The locking tabs 104 (in conjunction with stowage flaps (not shown)) help to secure the collapsible ripcord grip 100 into a parachute pack tray (not shown) by providing a resistance that must be overcome by a pulling force sufficient to extract the collapsible ripcord grip 100 from the parachute pack tray. The resistive force necessary for extraction of the ripcord grip 100 can be modified by changing the attachment location(s) of the locking tabs 104 on the collapsible ripcord grip 100, changing the dimensions of the locking tabs 104, the material composition of the locking tabs 104, and/or changing the dimensions and/or material composition of the flexible/collapsible material 300.

In an embodiment, each locking tab 104 is made of a material that is about one inches wide and is attached to the collapsible ripcord grip 100 in four symmetrical locations spaced between the first tuck flap 106 and the second tuck flap 108. In an embodiment, attachment of the locking tabs 104 to the collapsible ripcord grip 100 is made by stitching the locking tabs 104 to the collapsible ripcord grip 100. For example, a 42 stitch ⅞-in bartack with "E thread" can be used to stitch the locking tabs 104 to the collapsible ripcord grip 100. The location of the locking tabs 104 is dependent on the desired "pull force" to activate a parachute in the parachute pack tray. The dimensions of the locking tabs 104 and their position on the collapsible grip 100 determine, in part, the magnitude of the activation "pull force."

In an embodiment, the locking tabs 104 have a color that is different than the color(s) of the rest of the collapsible ripcord grip 100 to allow easier inspection of the collapsible ripcord grip 100. For example, inspection of the collapsible ripcord grip 100 can include verifying a fully seated collapsible ripcord grip 100 to increase individual jumper safety.

Also secured to the bottom layer 200 is a pin lanyard 204. The pin lanyard 204 is secured to the bottom layer 200. On one end of the pin lanyard 204 is a pin $202_1$ and on the other end of the lanyard pin 204 is a pin $202_2$. Pin $202_1$ and pin $202_2$ are collectively referred to herein as "pins 202." In an embodiment, the pins 202 are curved.

Figure 2B:
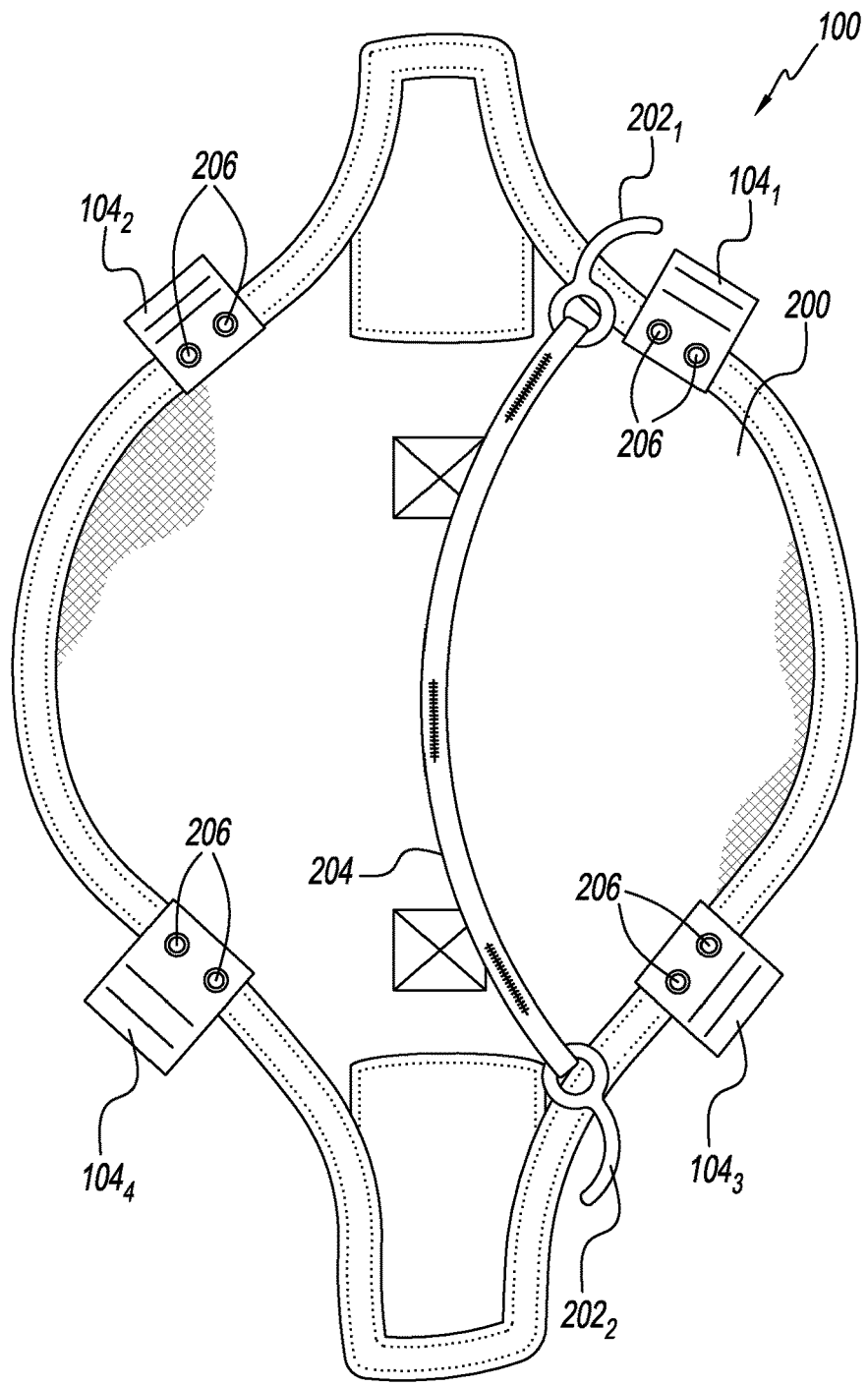
FIG. 2B, FIG. 2C, and FIG. 2D depict perspective views of other embodiments of collapsible ripcord grips.

FIG. 2B depicts an embodiment for securing the plurality of locking tabs 104 to the collapsible ripcord grip 100. Specifically, FIG. 2B depicts bolts 206 securing the plurality of locking tabs 104 to the collapsible ripcord grip 100. In other embodiments, an adhesive can be used in conjunction with the bolts 206 to secure the locking tabs 104 to the collapsible ripcord grip 100.

Figure 2C:
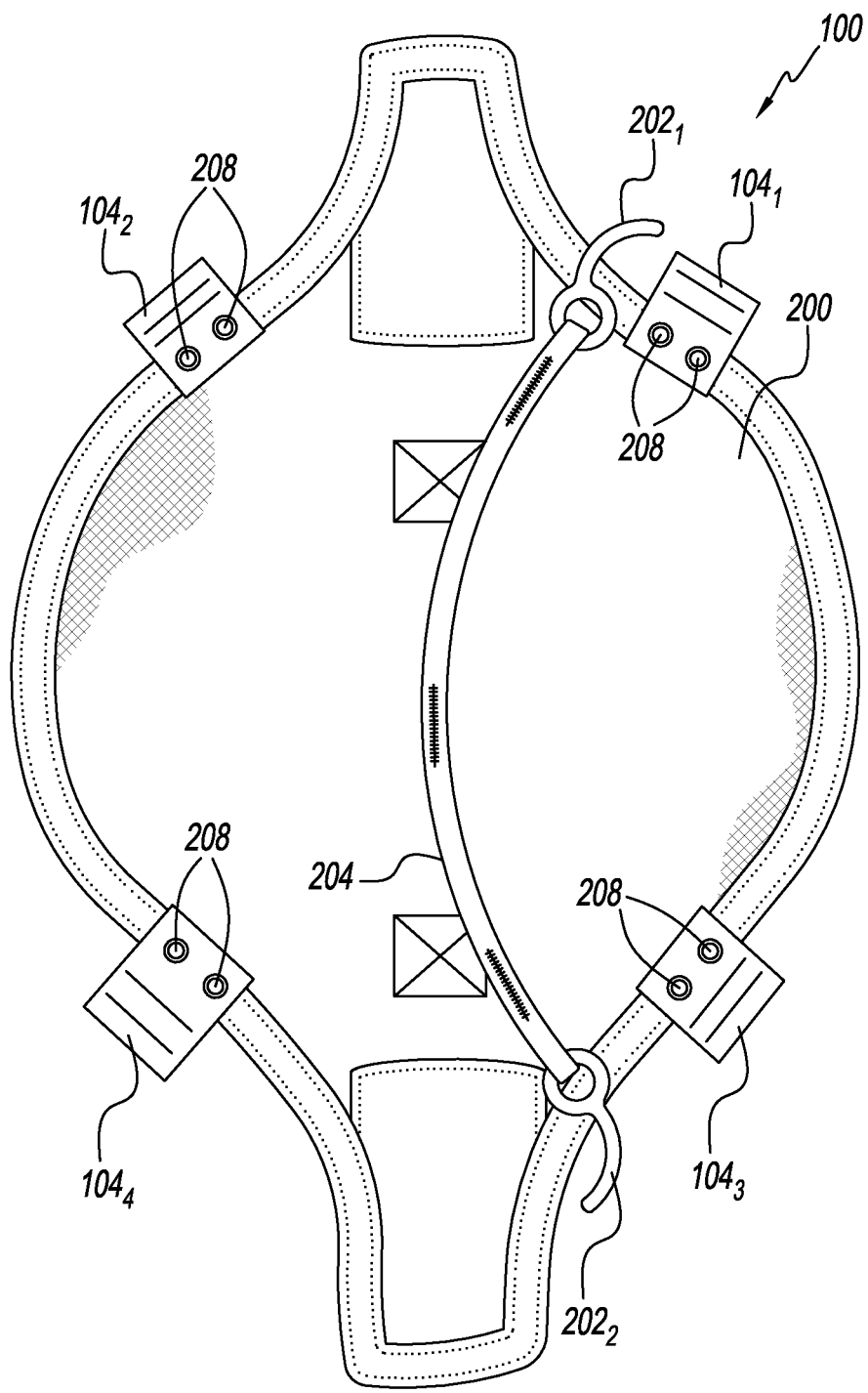

FIG. 2C depicts an embodiment for securing the plurality of locking tabs 104 to the collapsible ripcord grip 100. Specifically, FIG. 2C depicts rivets 208 securing the plurality of locking tabs 104 to the collapsible ripcord grip 100. In other embodiments, an adhesive can be used in conjunction with the rivets 208 to secure the locking tabs 104 to the collapsible ripcord grip 100.

Figure 2D:
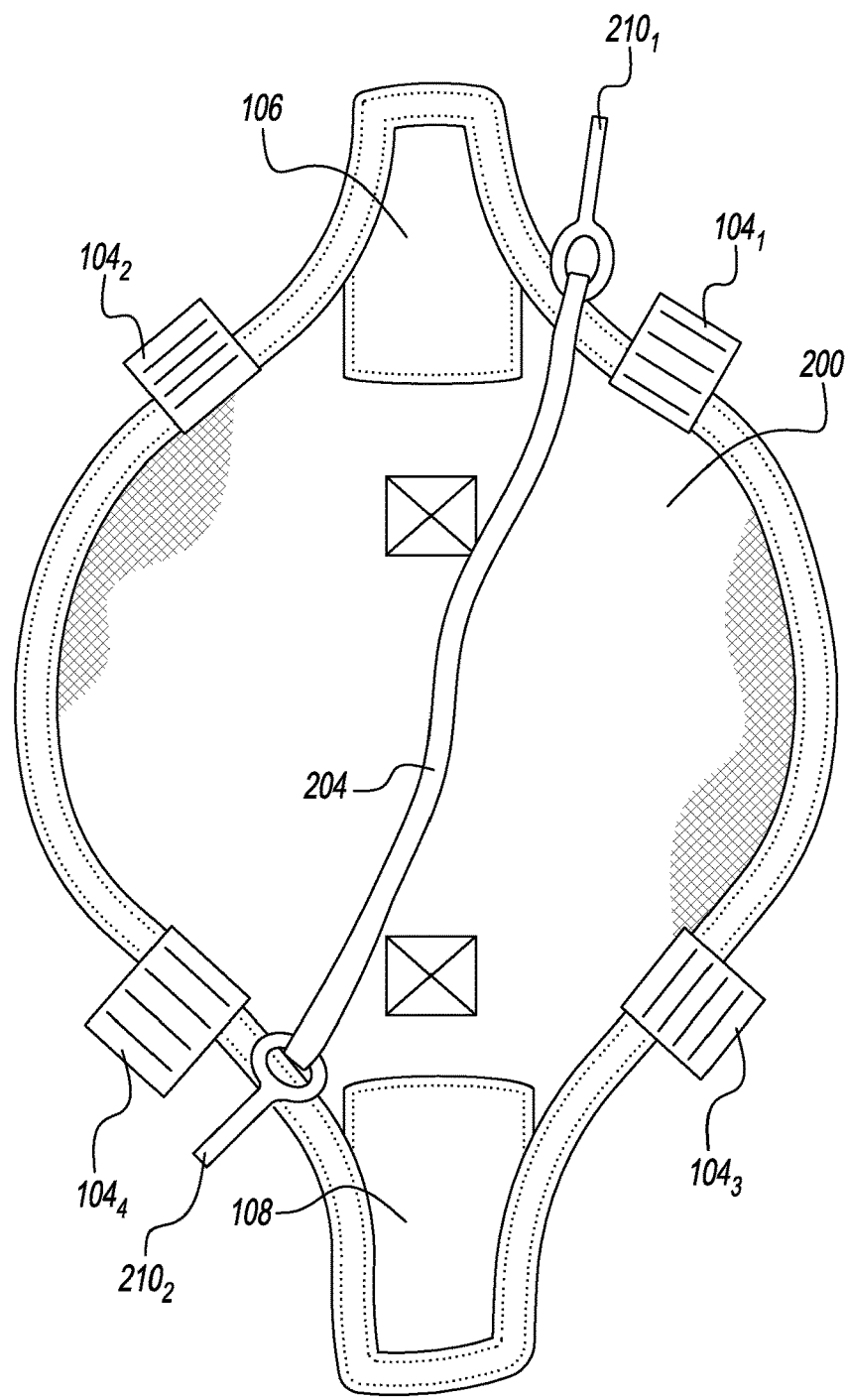

FIG. 2D depicts an embodiment that uses substantially straight lanyard pins $210_1$ and $210_2$ (collectively "pins 210"). Although other figures have been described herein as utilizing curved pins (e.g., pins 202) those descriptions are for illustrative purposes only and are not intended in any way to limit the scope of the material described and taught herein. It is appreciated that any of the embodiments described herein utilized pins 210 rather than pins 202.

FIG. 3A and FIG. 3B depict a cross-sectional view along the 3-3 line of the embodiment depicted in FIG. 1. In addition to those elements already discussed regarding FIG. 1, FIG. 2A, FIG. 2B, FIG. 2C, and FIG. 2D; these figures include a flexible collapsible member. FIG. 3A and FIG. 3B depicts a flexible collapsible member 300 that is included in FIG. 1, FIG. 2A, FIG. 2B, FIG. 2C, and FIG. 2D discussed above and is also included in the remaining figures. Returning to FIG. 3A, FIG. 3A depicts a cross-sectional view of the collapsible ripcord grip 100, along the 3-3 line of FIG. 1, with the ripcord grip handle 110 facing upwards. FIG. 3B depicts a cross-sectional view of the collapsible ripcord grip 100, along the 3-3 line of FIG. 1, with the locking tabs 104 facing upwards.

The flexible member 300 can be made of various materials (e.g., polycarbonate or spring steel). The flexible member 300 can have various shapes. For example, in an embodiment the flexible member 300 has a substantially circular shape designed to take the shape and maintain the contour of the parachute pack tray. In an embodiment, the flexible member 300 has a generally concave shape wherein one side is concave and the opposing is convex as shown in FIG. 3B. The type of material and the shape and thickness of the material determine the flexibility/collapsibility of the flexible member 300. The flexibility/collapsibility contribute to the overall pull force required to pull the collapsible ripcord grip 100 from the parachute pack tray.

The flexible member 300 has a substantially concave shape and includes a first side and a second side. The first tuck flap 106 and second tuck flap 108 extend from the flexible member 300. The first tuck flap 106 and second tuck flap 108 each include a first side and a second side. A plurality of locking tabs 104 is secured to the flexible member 300. A handle 110 is secured to the first side of the flexible member 300. A lanyard 204 is secured to the second side of said flexible member 300. A first locking pin secured to the first end of said lanyard 204 and a second locking pin secured to the second end of the lanyard 204.

A first layer of material is secured to the first side of the flexible member 300, the first side of the first tuck flap 106, and the first side of the second tuck flap 108. A second layer of material is secured to the second side of the flexible member 300, the second side of the first tuck flap 106, and the second side of the second tuck flap 108.

In an embodiment, the first layer of material includes a first window and a second window; and the second layer of material includes a first window and a second window. The first window of the first layer is aligned with the first window of the second layer and the second window of the first layer is aligned with the second window of the second layer.

In an embodiment, there are more the collapsible ripcord grip includes more than three layers (i.e., more layers than the flexible member 300, the first layer of material, and the second layer of material). For example, in an embodiment, the collapsible ripcord grip includes at least one other flexible member secured to the flexible member.

In an embodiment, the plurality of locking tabs is secured to the flexible member 300 by stitches, bolts, and/or rivets. In an embodiment, an adhesive is used in conjunction with the stitches, bolts, and/or rivets to secure the plurality of locking tabs to the flexible member.

Figure 4:
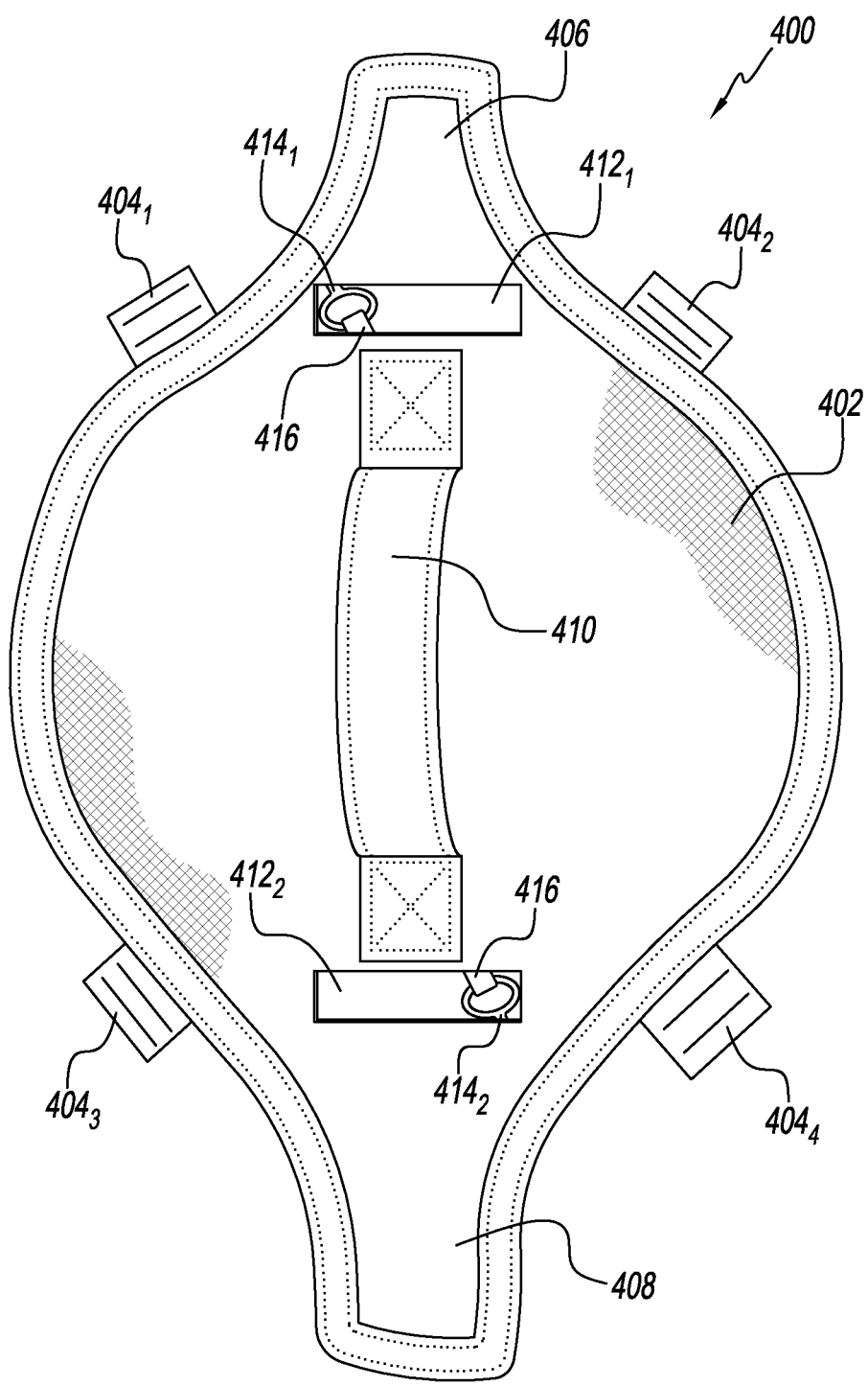
FIG. 4 depicts a perspective view of another embodiment.

FIG. 4 depicts a perspective view of a collapsible ripcord grip 400, in accordance with an embodiment. The collapsible ripcord grip 400 includes a flexible material (not shown) sandwiched between at least two layers of outer material; a first tuck flap 406; a second tuck flap 408; and locking tabs $404_1$, $404_2$, $404_3$, and $404_4$ (collectively "locking tabs 404").

In FIG. 4, only one of the outer layers is visible and is referred to herein as outside layer 402. The outer layer 402 can be made of various materials. For example, in an embodiment, the outer layer can be made of CORDURA® fabric.

Attached to the outer layer 402 is a deployment/ripcord grip handle 410. In an embodiment, the ripcord grip handle 110 is constructed from a textile (e.g., CORDURA®), metal (e.g., steel/aluminum), composite (e.g., plastic/carbon fiber) and/or other similar material. There are various ways in which the ripcord grip handle 410 is attached to the outer layer 402. For example, in an embodiment, strips of material are used to form the ripcord grip handle 410 that is sewn, riveted, bolted, and/or any similar method to the outer layer 402. The location of the ripcord grip handle 410 is determined by the principles of ergonomics for an individual movement to pull or deploy the parachute without hindering deployment of a parachute.

In other embodiments, the ripcord grip handle 410 is secured to the ripcord grip 400 using an adhesive and rivets; stitching and an adhesive; or an adhesive and bolts. The location of the ripcord grip handle 410 is determined by the resistance of force required to pull or deploy the parachute without hindering deployment of a parachute. In other embodiments, the ripcord grip handle 410 is secured to the ripcord grip 400 using an adhesive and rivets; stitching and an adhesive; or an adhesive and bolts.

The collapsible ripcord grip 400 also includes site windows $412_1$ and $412_2$. Site windows $412_1$ and $412_2$ are collectively referred to herein as "site windows 412." Sight window $412_1$ and $412_2$ allows inspection of pin $414_1$ and $414_2$, respectively, for easy inspection (e.g., for proper seating and placement) by a jumper, a parachute rigger, and/or a jumpmaster. Pin $414_1$ and pin $414_2$ are collectively referred to herein as "pins 414." In an embodiment, the pins 414 are straight. In another embodiment, the pins 414 are curved. A lanyard 416 is partially visible in the site windows 412 and is attached to an opposing side (not shown) of the collapsible ripcord grip 400.

Figure 5A:
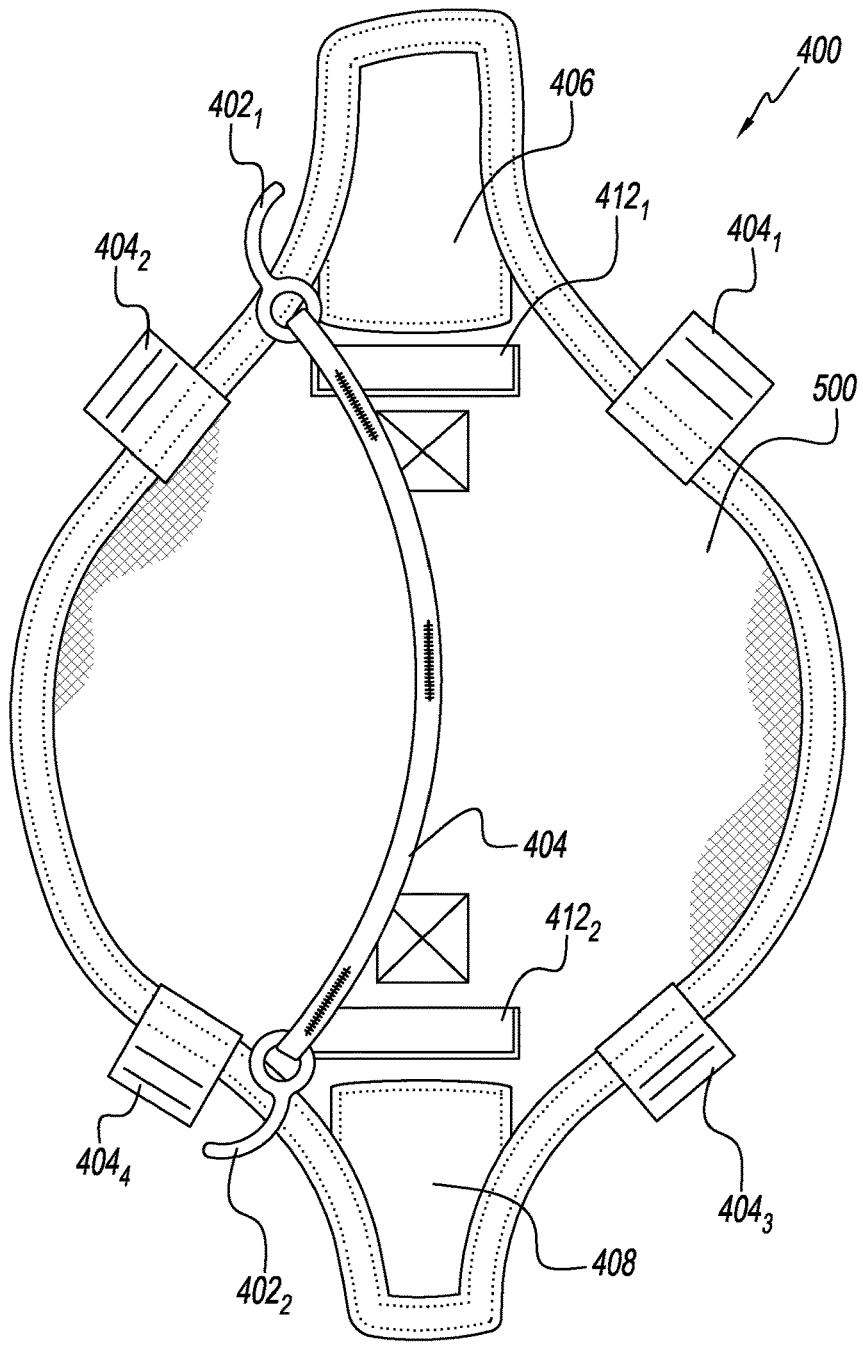
FIG. 5A depicts another perspective view of the embodiment of the collapsible ripcord grip depicted in FIG. 4.

FIG. 5A depicts another perspective view of the embodiment of the collapsible ripcord grip 400 depicted in FIG. 4. Specifically, FIG. 5A depicts an opposite side 500 (also referred to herein as the "bottom layer 500") of the collapsible ripcord grip 400 depicted in FIG. 4. Attached to the bottom layer 500 is a plurality of locking tabs 504. The lanyard 404 is secured to the collapsible ripcord grip on the bottom layer 200 and sewn through the three layers of material (i.e., the first and second layer of material and a flexible member (not shown)). For example, sewing is accomplished with a 42 stitch per inch bar tack or equivalent stitch pattern. In an embodiment, the lanyard 404 is riveted and/or bolted to the collapsible ripcord grip 400.

In FIG. 5A, the locking tabs 404 are secured to the collapsible ripcord grip 400 by stitching. The locking tabs 404 (in conjunction with stowage flaps (not shown)) help to secure the collapsible ripcord grip 400 into a parachute pack tray (not shown) by providing a resistance that must be overcome by a pulling force sufficient to extract the collapsible ripcord grip 400 from the parachute pack tray. The resistive force necessary for extraction of the ripcord grip 400 can be modified by changing the attachment location(s) of the locking tabs 404 on the collapsible ripcord grip 400, changing the dimensions of the locking tabs 404, the material composition of the locking tabs 404, and/or changing the dimensions and/or material composition of the flexible/collapsible material 400.

In an embodiment, each locking tab 404 is made of a material that is about one inches wide and is attached to the collapsible ripcord grip 400 in four symmetrical locations spaced between the first tuck flap 406 and the second tuck flap 408. In an embodiment, attachment of the locking tabs 404 to the collapsible ripcord grip 400 is made by stitching the locking tabs 404 to the collapsible ripcord grip 400. For example, a 42 stitch ⅞-in bartack with "E thread" can be used to stitch the locking tabs 404 to the collapsible ripcord grip 400. The location of the locking tabs 404 helps to achieve a desired "pull force" to activate a parachute in the parachute pack tray. The dimensions of the locking tabs 404 and their position on the collapsible grip 400 determine, in part, the magnitude of the activation "pull force."

In an embodiment collapsible ripcord grip 400 includes a flexible member 300 (not shown) having a first side and a second side. A first layer of material 402 is secured to the first side of the flexible member 300 and a second layer of material 500 is secured to the second side of the flexible member 300. The first layer of material 402 and the second layer of material 500 are secured to each other. A first tuck flap 406 extends from the secured first layer of material 402 and the second layer of material 500. A second tuck flap 408 extends from the secured first layer of material 402 and the second layer of material 500. A plurality of locking tabs 404 (e.g. four) is secured to the first layer of material 402 and the second layer of material 500. A handle 410 is in contact with the first layer of material 402 and is secured to the first layer of material 402, the flexible member 300, and the second layer of material 500. A lanyard 404 is in contact with the second layer of material 500 and is secured to the first layer of material 402, the flexible member 300, and the second layer of material 500. The lanyard 404 includes a first end and a second end. A first locking pin $402_1$ is secured to the first end of the lanyard 404 and a second locking pin $402_2$ is secured to the second end of the lanyard 404.

In an embodiment, the first layer of material 402 includes a first window $412_1$ and a second window $412_2$; and the second layer of material 500 includes a first window and a second window. The first window $412_1$ of the first layer 402 is aligned with the first window of the second layer 500 and the second window 412₂ of the first layer of material 402 is aligned with the second window of the second layer of material 500.

In an embodiment, there are more the collapsible ripcord grip includes more than three layers (i.e., more layers than the flexible member 300, the first layer of material 402, and the second layer of material 500). For example, in an embodiment, the collapsible ripcord grip includes at least one other flexible member secured to the flexible member 300.

In an embodiment, the plurality of locking tabs 404 is secured to the flexible member 300 by stitches, bolts, and/or rivets. In an embodiment, an adhesive is used in conjunction with the stitches, bolts, and/or rivets to secure the plurality of locking tabs to the flexible member.

In an embodiment, in addition to site windows 412, the locking tabs 404 have a color that is different than the color(s) of the rest of the collapsible ripcord grip 400 to allow easier inspection of the collapsible ripcord grip 400. For example, inspection of the collapsible ripcord grip 400 can include verifying a fully seated collapsible ripcord grip 400 to increase individual jumper safety.

Figure 5B:
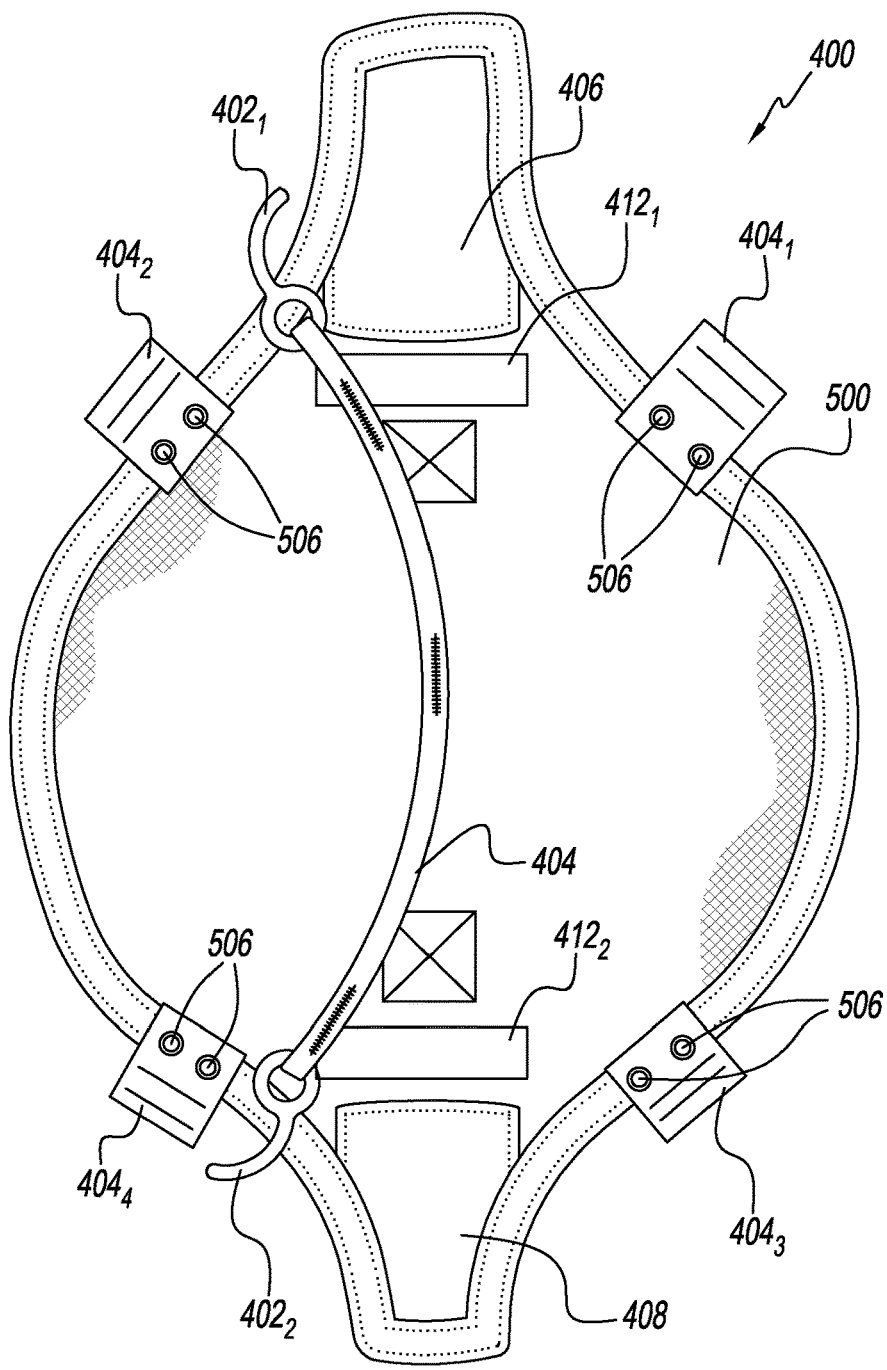
FIG. 5B and FIG. 5C depict perspective views of other embodiments of collapsible ripcord grips.

FIG. 5B depicts an embodiment for securing the plurality of locking tabs 404 to the collapsible ripcord grip 400. Specifically, FIG. 5B depicts bolts 506 securing the plurality of locking tabs 404 to the collapsible ripcord grip 400. In other embodiments, an adhesive can be used in conjunction with the bolts 506 to secure the locking tabs 404 to the collapsible ripcord grip 400.

Figure 5C:
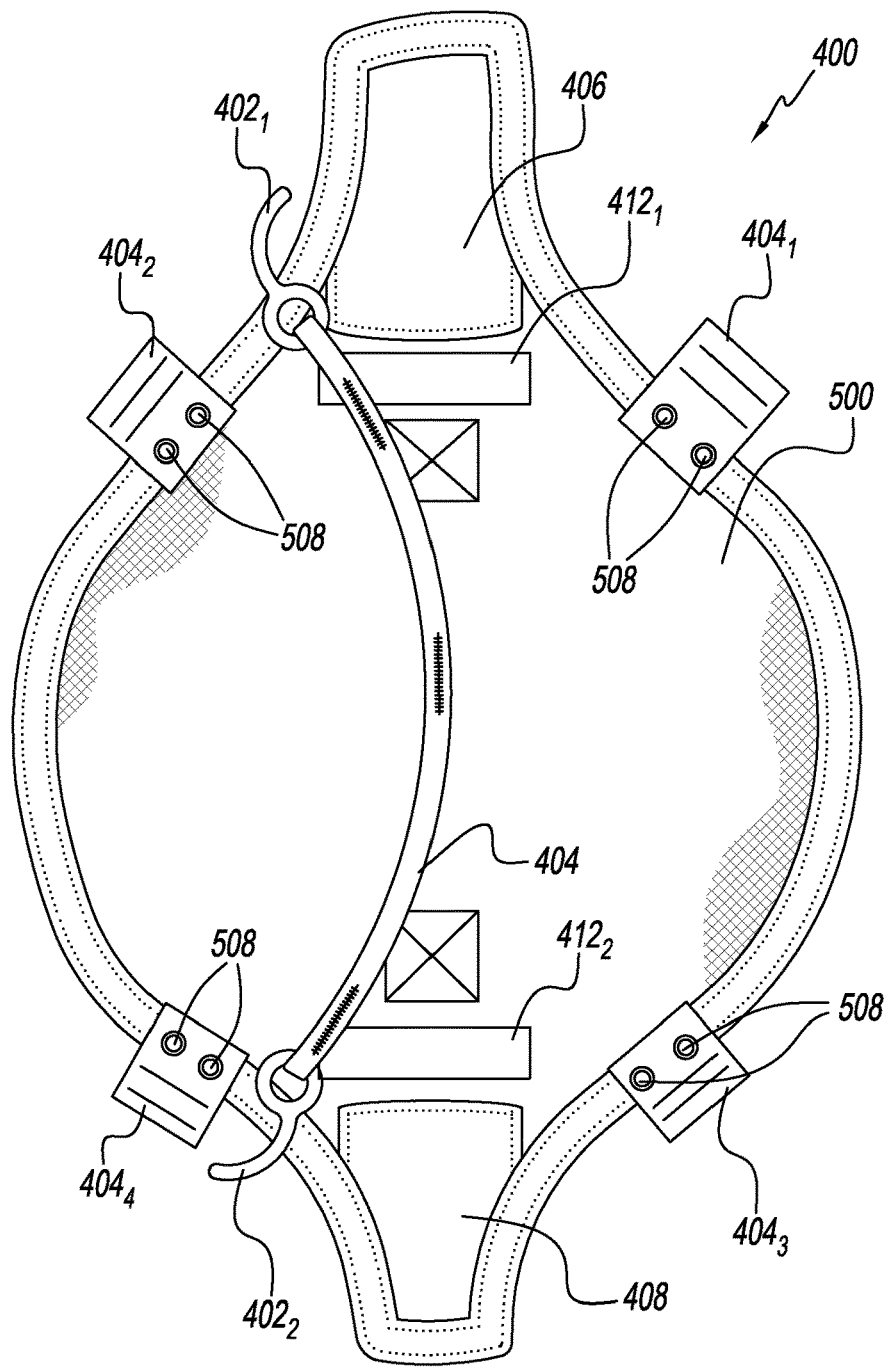

FIG. 5C depicts an embodiment for securing the plurality of locking tabs 404 to the collapsible ripcord grip 400. Specifically, FIG. 5C depicts rivets 508 securing the plurality of locking tabs 404 to the collapsible ripcord grip 400. In other embodiments, an adhesive can be used in conjunction with the rivets 508 to secure the locking tabs 404 to the collapsible ripcord grip 400.

Figure 6A:
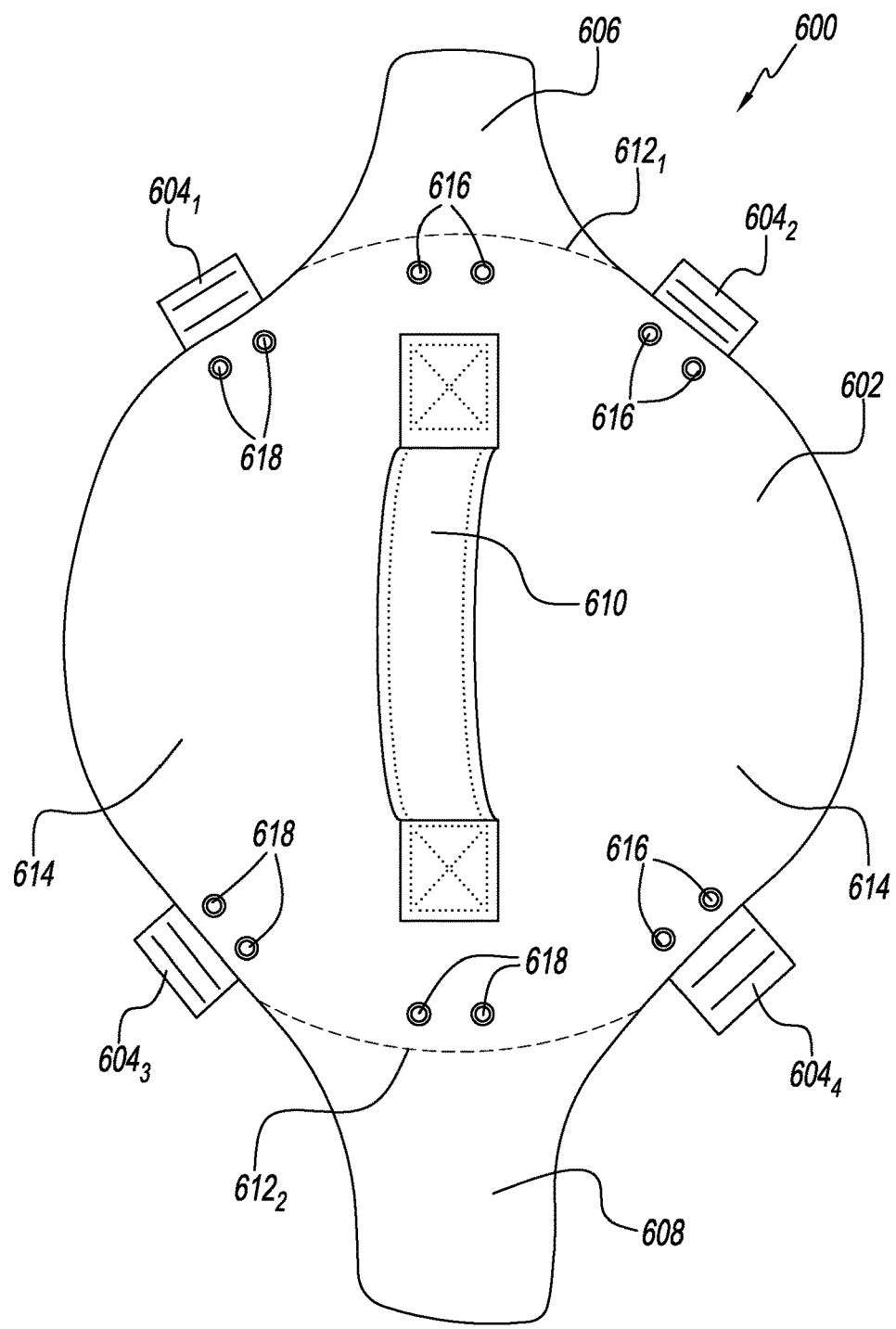
FIG. 6A depicts a perspective view of an embodiment.

FIG. 6A depicts a perspective view of yet another embodiment. Specifically, FIG. 6A depicts a perspective view of a collapsible ripcord grip 600, in accordance with an embodiment. The collapsible ripcord grip 600 includes a first tuck flap 606; a second tuck flap 608; locking tabs 604₁, 604₂, 604₃, and 604₄ (collectively "locking tabs 604"); ripcord grip handle 610; and lanyard (not shown in FIG. 6). In an embodiment, the collapsible ripcord grip 600 is from a single piece of material 614 that does not include the first tuck flap 606; the second tuck flap 608; and locking tabs 604₁, 604₂, 604₃, and 604₄ (collectively "locking tabs 604"). The first tuck flap 606; the second tuck flap 608; and locking tabs 604 are subsequently secured to the material 614. There are various ways in which the first tuck flap 606; the second tuck flap 608; and locking tabs 604 are secured to the material 614. For example, in an embodiment, the first tuck flap 606 and the second tuck flap 608; and/or the locking tabs 604 are secured to the material 614 using rivets. In another embodiment, the first tuck flap 606 and the second tuck flap 608; and/or the locking tabs 604 are secured to the material 614 using bolts.

For illustrative purposed only, FIG. 6A depicts locking tab 604₂, locking tab 604₄, and the first tuck flap 606 as being secured to the material 614 by rivets 616. FIG. 6A also depicts locking tab 604₁, locking tab 604₃, and the second tuck flap 608 as being secured to the material 614 by bolts 618. It is appreciated that any combination of rivets 616 and/or bolts 618 can be used to secure the locking tabs 604, the first tuck flap 606, and/or the second tuck flap 608 to the material 614.

The collapsible ripcord grip 600 is made of a flexible material (e.g., polycarbonate). The composition of the flexible material, the dimensions of the flexible material, and other factors contribute to the overall pull strength of the collapsible ripcord grip 600. Other factors that contribute to the overall pull strength of the collapsible ripcord grip 600 include, but are not limited to, the location of the locking tabs 604 with respect to the first tuck flap 606 and the second tuck flap 608; and the dimensions of the locking tabs 604.

For example, positioning locking tab 604₁ and locking tab 604₂ closer to the first tuck flap 606; and locking tab 604₃ and locking tab 604₄ closer to the second tuck flap 608 increases the pull strength required to extract the collapsible ripcord grip 600 from the pack tray. As the position of the locking tab 604₁ and locking tab 604₂ is moved further away from the first tuck flap 606; and locking tab 604₃ and locking tab 604₄ is likewise moved further away from the second tuck flap 608 the pull strength decreases.

There are various ways in which the collapsible ripcord grip 600 can be constructed. For example, in an embodiment, the collapsible ripcord grip 600 is "stamped" from a die having a substantially circular shape 614 defined in part by optional dashed lines 612₁ and 612₂. In an embodiment, a die stamps material having a shape that includes the substantially circular shape 614. In an embodiment, a die stamps material having a shape that includes the substantially circular shape 614. In an embodiment, the material is made of a sheet metal or a polysheeting (e.g., a polycarbonate) material.

As indicated above, the first tuck flap 606, the second tuck flap 608, and the locking tabs 604 can be secured to the collapsible ripcord grip 600 in different ways. Other example, embodiments are described below that include collapsible ripcord grips having die stamped components.

Figure 6B:
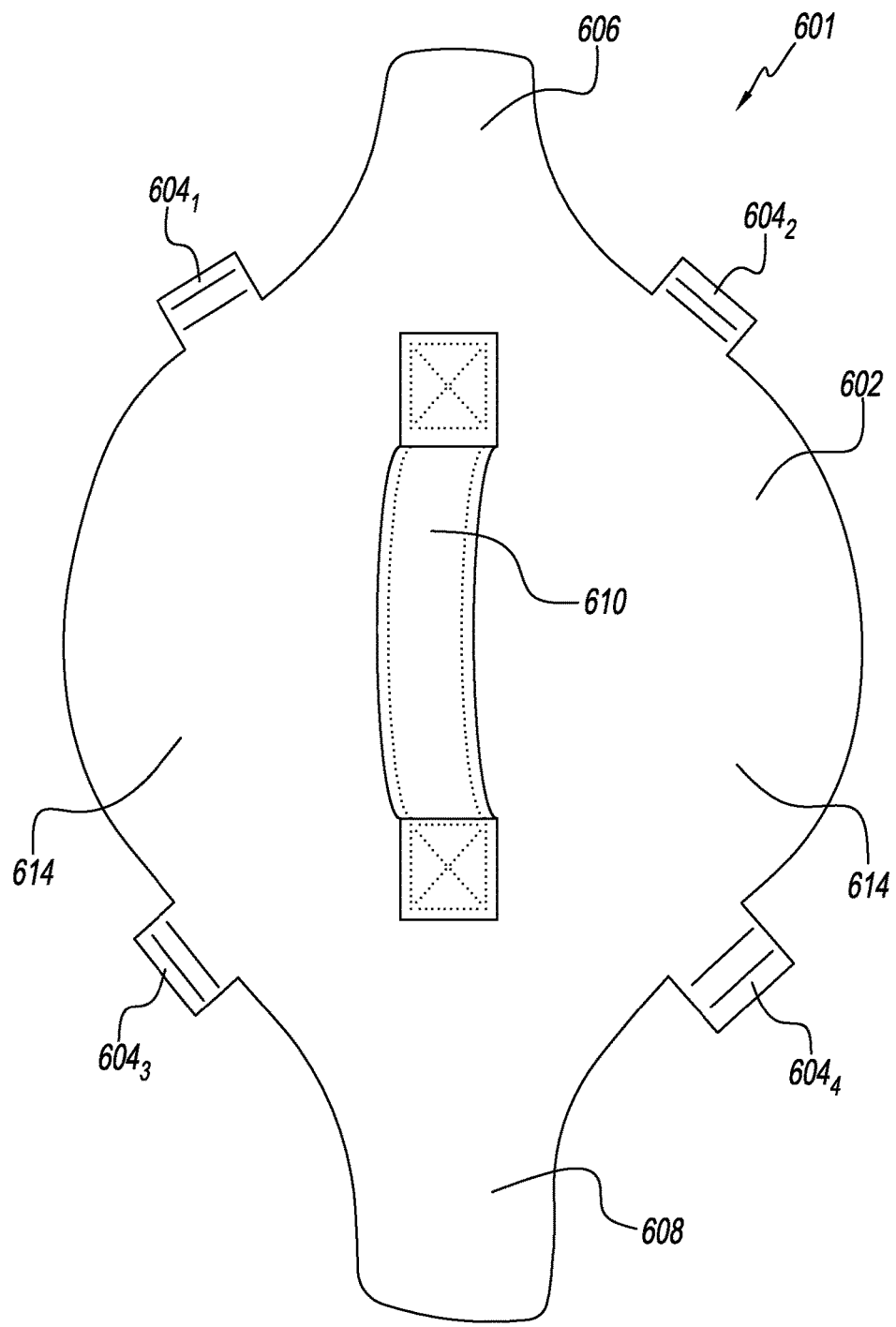
FIG. 6B depicts a perspective view of an embodiment.

FIG. 6B depicts an embodiment of a collapsible ripcord grip 601. The collapsible ripcord grip 601 is stamped from a die stamp having a shape that includes the substantially circular shape 614, the first tuck flap 606, the second tuck flap 608, and locking tabs 604. The remaining components (e.g., grip handle 610, lanyard (not shown), and pins (not shown)) are subsequently added to the collapsible ripcord grip 601.

Figure 6C:
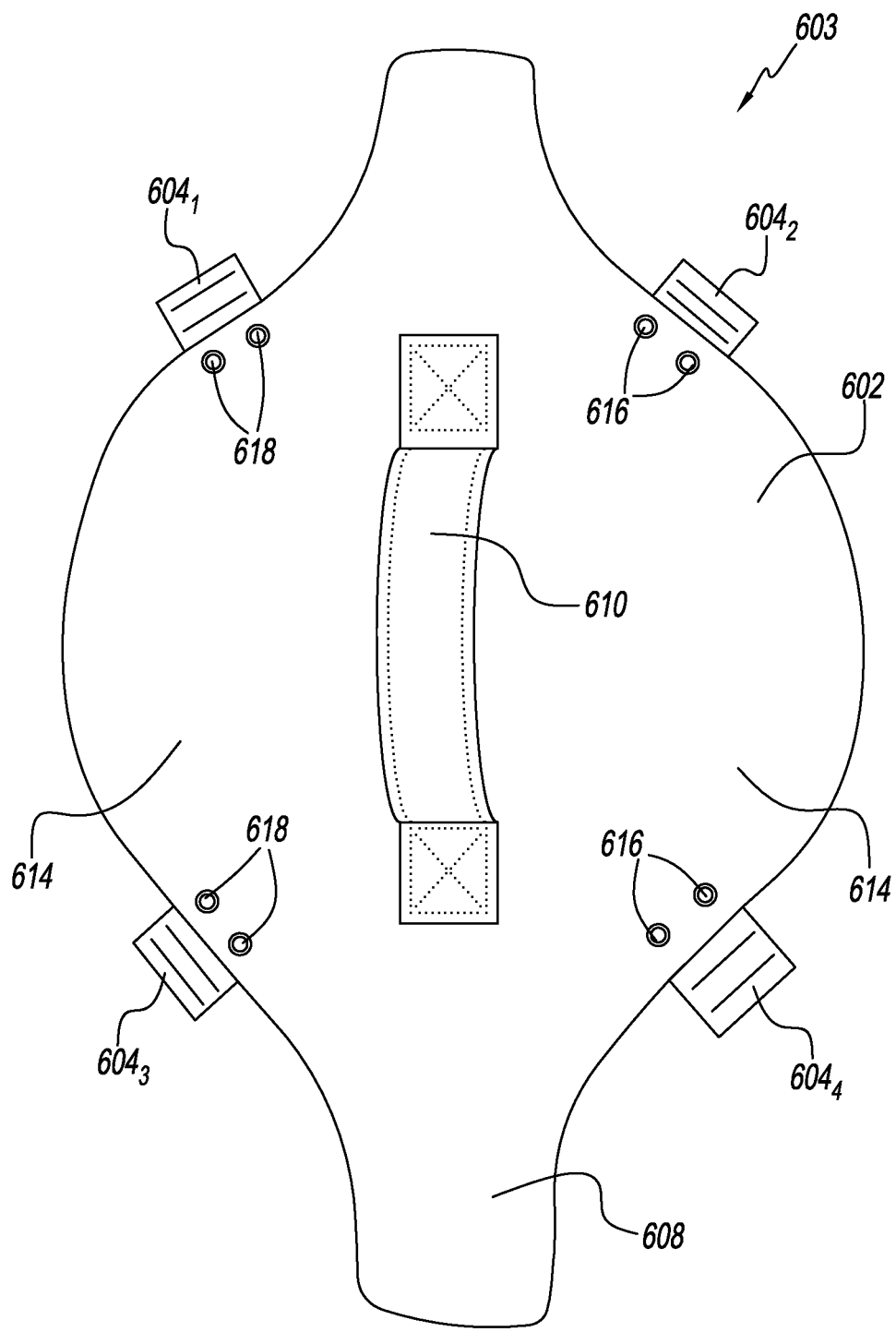
FIG. 6C depicts a perspective view of an embodiment.

FIG. 6C depicts an embodiment of a collapsible ripcord grip 603. The collapsible ripcord grip 603 is stamped from a die stamp having a shape that includes the substantially circular shape 614, the first tuck flap 606, and the second tuck flap 608.

The locking tabs 604 are subsequently secured to the material 614 in various ways. For example, in an embodiment, the locking tabs 604 are secured to the material 614 using rivets 616. In another embodiment, the locking tabs 604 are secured to the material 614 using bolts 618.

For illustrative purposed only, FIG. 6C depicts locking tab 604₂ and locking tab 604₄ as being secured to the collapsible ripcord grip 603 by rivets 616. FIG. 6C also depicts locking tab 604₁ and locking tab 604₃ as being secured to the collapsible ripcord grip 603 by bolts 618. It is appreciated that any combination of rivets 616 and/or bolts 618 can be used to secure the locking tabs 604 to the collapsible ripcord grip 603.

The remaining components (e.g., grip handle 610, lanyard (not shown), and pins (not shown) are subsequently added to the collapsible ripcord grip 603.

Figure 7:
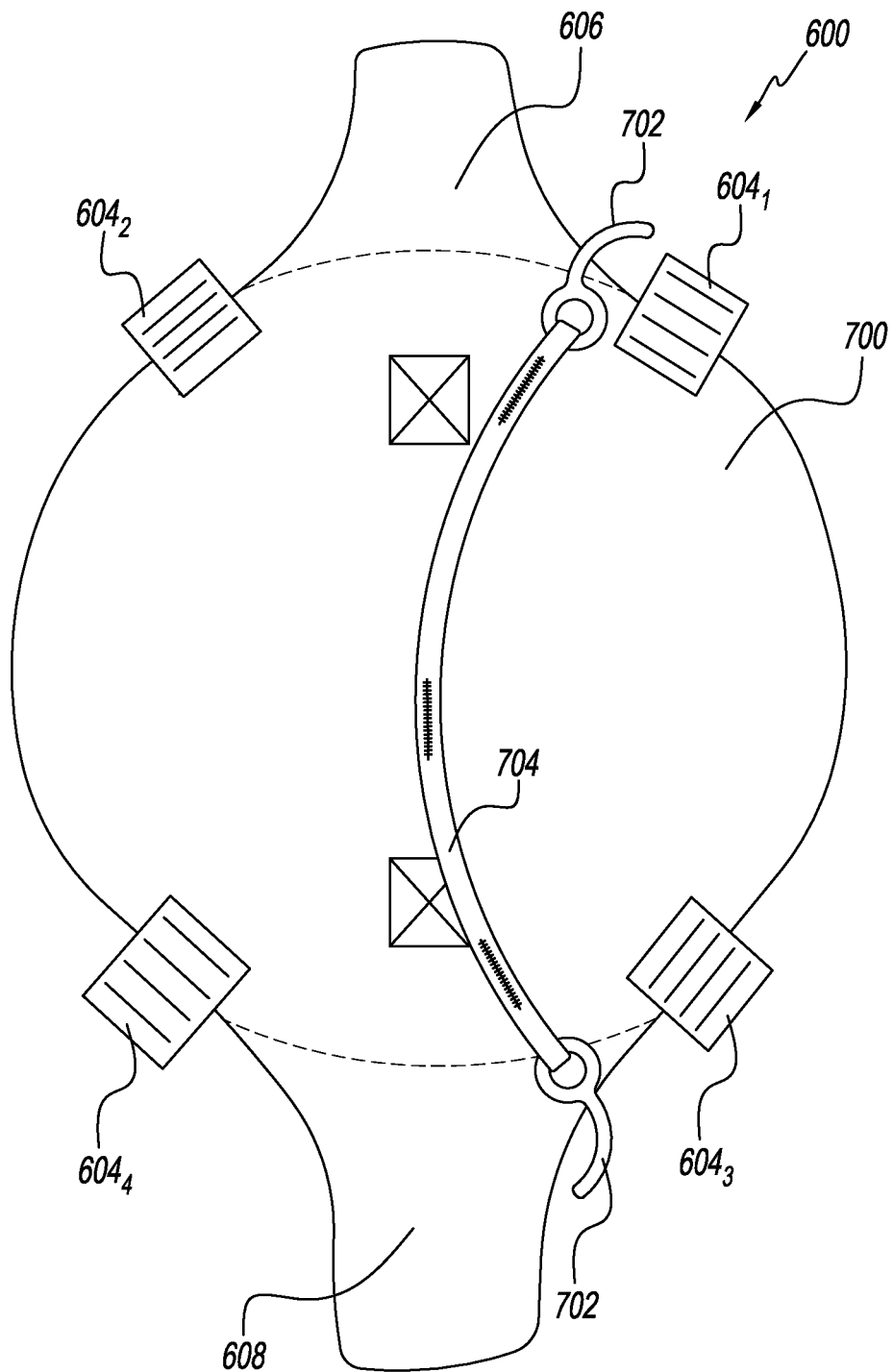
FIG. 7 depicts another perspective view of the embodiment of the collapsible ripcord grip depicted in FIG. 6.

FIG. 7 depicts another perspective view of the embodiment of the collapsible ripcord grip 600 depicted in FIG. 6A. For illustrative purposes only, FIG. 7 depicts an opposite side 700 (also referred to herein as the "bottom layer 700")

of the collapsible ripcord grip 600 depicted in FIG. 6A. However, it is appreciated that a lanyard 700 and pins 702 are included on the bottom layer of the embodiment 601 and 603 depicted in FIG. 6B and FIG. 6C, respectively.

In an embodiment, a plurality of locking tabs 604 is attached to the bottom layer 700. The lanyard 704 is attached to the bottom layer 700 in at least one location. Illustratively, the lanyard 704 is attached to the bottom layer 700 in one location.

The locking tabs 604 (in conjunction with stowage flaps (not shown)) help to secure the collapsible ripcord grip 600 into a parachute pack tray (not shown) by providing a resistance that must be overcome by a pulling force sufficient to extract the collapsible ripcord grip 600 from the parachute pack tray. The resistive force necessary for extraction of the collapsible ripcord grip 600 can be modified by changing the attachment location(s) of the locking tabs 604 on the collapsible ripcord grip 600, changing the dimensions of the locking tabs 604, the material composition of the locking tabs 604, and/or changing the dimensions and/or material composition of the flexible/collapsible material 600.

In an embodiment, each locking tab 604 is made of a material that is about one inches wide and is attached to the collapsible ripcord grip 600 in four symmetrical locations spaced between the first tuck flap 606 and the second tuck flap 608. In an embodiment, attachment of the locking tabs 604 to the collapsible ripcord grip 600 is made by stitching the locking tabs 604 to the collapsible ripcord grip 600. For example, a 42 stitch ⅞-in bartack with "E thread" can be used to stitch the locking tabs 604 to the collapsible ripcord grip 600. The location of the locking tabs 604 helps to achieve a desired "pull force" to activate a parachute in the parachute pack tray. The dimensions of the locking tabs 604 and their position on the collapsible grip 600 determine, in part, the magnitude of the activation "pull force."

In an embodiment, the locking tabs 604 have a color that is different than the color(s) of the rest of the collapsible ripcord grip 600 to allow easier inspection of the collapsible ripcord grip 600. For example, inspection of the collapsible ripcord grip 600 can include verifying a fully seated collapsible ripcord grip 600 to increase individual jumper safety.

Figure 8:
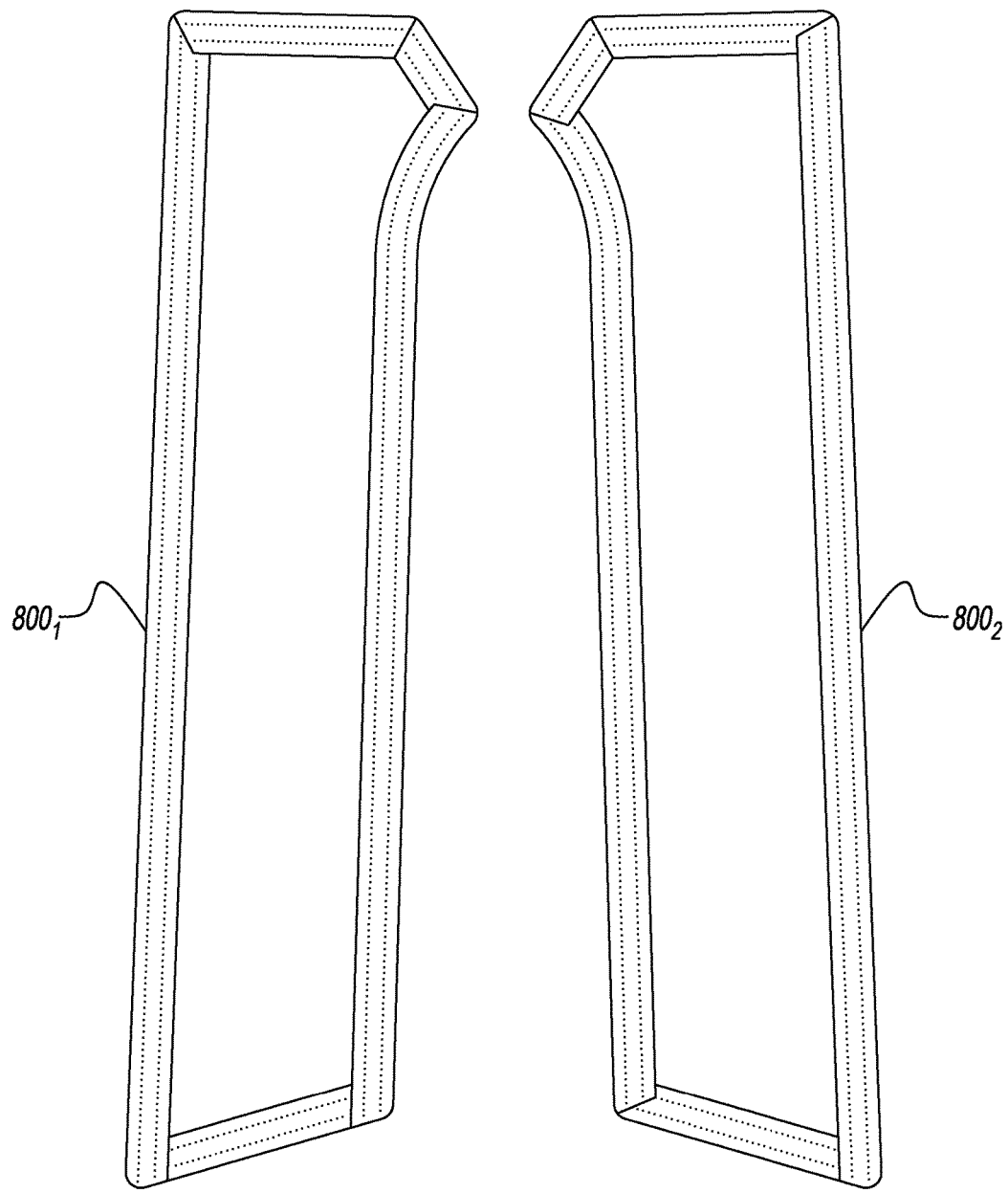
FIG. 8 depicts a perspective view, in accordance with an embodiment.

FIG. 8 depicts stowage flaps $800_1$ and $800_2$ (collectively referred to herein as "stowage flaps 800"), in accordance with an embodiment. Illustratively, each stowage flap 800 has two 42 stitch ⅞-in, bartack located on the top and bottom inner portion which serve to interface and mate with the locking tabs when the collapsible ripcord grip is seated on the parachute (not shown). These bartack are placed during attachment of the stowage flap. In an embodiment, the stowage flaps 800 are made of CORDURA®.

Figure 9:
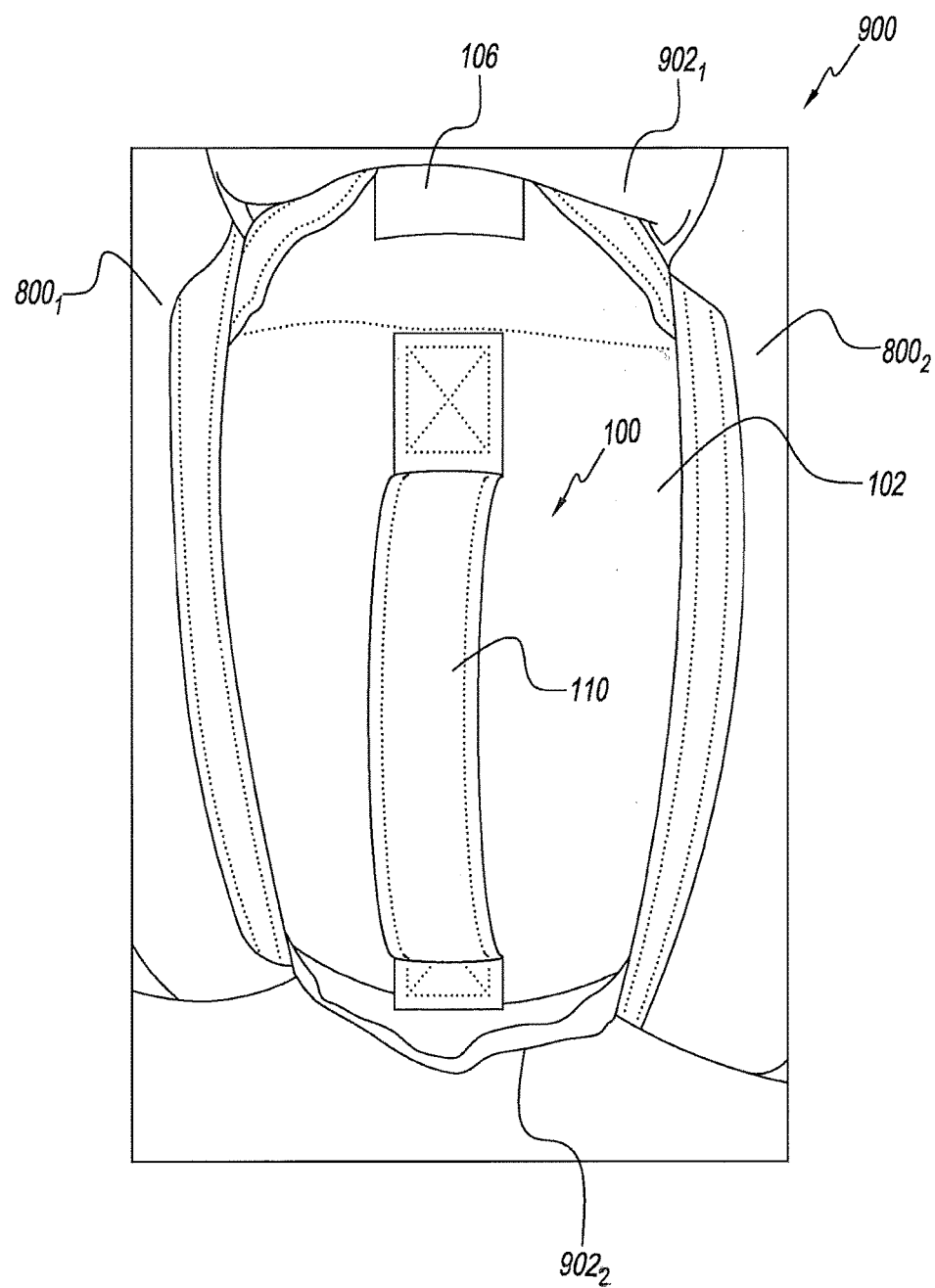
FIG. 9 depicts a perspective view of an embodiment in a parachute pack tray.

FIG. 9 depicts an embodiment in a parachute pack tray 900. Specifically, FIG. 9 depicts collapsible ripcord grip 100 inside a parachute pack tray system 900. Visible in FIG. 9 are the outer layer 102, ripcord grip handle 110, and stowage flaps 800. Pocket $902_1$ and stowage pocket $902_2$ (collectively "stowage pockets 902") are components of the pack tray 900. Stowage pockets 902 are not part of the collapsible ripcord grip 100.

A pack tray can be retrofitted to accommodate the collapsible ripcord grips depicted in the figures. For example, sewing stowage pockets 902 and stowage flaps 800 onto a pack tray accomplish retrofitting a pack tray.

By inserting $202$ and $202_2$ in the parachutes soft closing loops to close the parachute packtray, then collapsing the collapsible ripcord grip 100 behind the stowage flaps 800 and stowage pockets 902 the collapsible ripcord grip 100 is secured in place by way of pressure exerted by the folded parachute inside the packtray (not shown) and pressure against the stowage flaps 800 and stowage pockets 902. The concave shape of the flexible member 300 conforms to the contour of the parachute inside the pack tray 900. In addition, an embodiment can be used with parachutes that incorporate a spring assist as a deployment assist device which that applies an outward pressure and force against the collapsible ripcord grip, the first tuck flap 106, the second tuck flap 108, and the stowage pockets 900.

Activation of the parachute is achieved when a sufficient pulling force is applied to the ripcord grip handle 110. When the ripcord handle 110 is pulled, the collapsible ripcord grip 100 collapses and is removed from each stowage flap 800 allowing the locking tabs 104 (not shown in FIG. 9) and tuck flaps 106 and 108 to receive tension and be pulled free from the pack tray 900. The sufficient pulling force created with such a movement transfers to the lanyard 204 and locking pins 202. The locking pins 202 become dislodged from a soft closing loop and the parachute is activated.

The locking tab 104 allows closure of the collapsible ripcord grip 100 with an aerodynamic transition of the collapsible ripcord grip 100 from inside the stowage flaps 800 on the parachute pack tray 900 to the top of the parachute pack tray. The stowage flaps 800 and collapsible ripcord grip 100 with locking tabs 104 are designed to provide an aerodynamic closure of the parachute pack 900 and maintain a specific force required to prevent accidental deployment caused by airflow and lifting the ripcord grip off the parachute pack tray during parachute jump operations.

The locking pins 202, 210 are secured in place with a textile, composite and or metal type material sewn, welded or an epoxy material to the collapsible ripcord grip 100. Although some figures depict pins 210 and others depict 202, it is appreciated that they are used interchangeably and that all of the figures depicted can use either pins 210 and/or pins 202.

The flexible member 300 is fabricated in a circular, conical, straight or rectangular shaped with multiple ply of textiles, plastics, metal and or composites or like materials. The flexible member 300, constructed of textiles, plastics, metal and or composites or like materials specific to the application to be utilized, may be utilized as an "extractor or pilot chute ring." The extractor or pilot chute ring is designed to prevent movement of the extractor or a spring loaded pilot chute during storage, transportation and throughout the duration of a parachute jump until such time as the parachute is determined by the parachutist to be deployed and or maintenance or service is required.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. Embodiments are defined solely by the appended claims including any amendments made during the pendency of this application and all equivalents of those claims as issued.

In the embodiments described herein, and depicted in the FIGs., some components are depicted and described as a single component. However, these depictions and descriptions are not intended, in any way, to limit the scope of the material taught herein.

An "Abstract of the Disclosure" is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A parachute ripcord grip engageable with stowage flaps of a parachute pack tray, comprising:
   a member having multiple layers one layer of which consists of at least one of a multiple ply of textiles, plastics, metal and composites, wherein said member has a substantially circular outer configuration and convex-shaped first side having a ripcord handle interconnected therewith and a concave-shaped a second side;
   a first tuck flap extending from one portion of said member,
   wherein said first tuck flap includes a first side and a second side;
   a second tuck flap extending from an opposing portion of said member,
   wherein said second tuck flap includes a first side and a second side;
   a plurality of locking tabs secured to said member;
   a lanyard secured to said second side of said flexible member,
   wherein said lanyard includes a first end and a second end;
   a first locking pin secured to said first end of said lanyard; and
   a second locking pin secured to said second end of said lanyard;
   whereupon the ripcord handle being pulled by an operator, the member is dimensioned and configured to flex and thereby disengage from the stowage flaps and whereby the locking tabs and tuck flaps receive tension and are, in turn, pulled free from the parachute pack tray along with the lanyard and locking pins; and
   further comprising a first layer of material secured to said first side of said member, said first side of said first tuck flap, and said first side of said second tuck flap; and a second layer of material secured to said second side of said member, said second side of said first tuck flap, and said second side of said second tuck flap.

2. The apparatus of claim 1, wherein said first layer of material includes a first window and a second window, said second layer of material includes a first window and a second window, and said first window of said first layer is aligned with said first window of said second layer and said second window of said first layer is aligned with said second window of said second layer.

3. The apparatus of claim 1 wherein plurality of locking tabs is secured to said member by at least one of stitches, bolts, and rivets.

4. The apparatus of claim 3 further comprising an adhesive securing said plurality of locking tabs to said member.

5. The apparatus of claim 1 wherein said first locking pin and said second locking pin have one of a curved shape and a straight shape.

* * * * *